United States Patent
Xie et al.

(10) Patent No.: US 9,753,335 B2
(45) Date of Patent: Sep. 5, 2017

(54) ARRAY SUBSTRATE WITH ADDITIONAL ELECTRODE FORMED ABOVE GATE LINE, MANUFACTURING METHOD THEREOF AND LIQUID CRYSTAL DISPLAY

(75) Inventors: Zhenyu Xie, Beijing (CN); Xu Chen, Beijing (CN); Chunping Long, Beijing (CN); Shaoying Xu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 487 days.

(21) Appl. No.: 13/380,989

(22) PCT Filed: Apr. 22, 2011

(86) PCT No.: PCT/CN2011/073157
§ 371 (c)(1),
(2), (4) Date: Dec. 27, 2011

(87) PCT Pub. No.: WO2011/131143
PCT Pub. Date: Oct. 27, 2011

(65) Prior Publication Data
US 2012/0099041 A1   Apr. 26, 2012

(30) Foreign Application Priority Data
Apr. 23, 2010 (CN) .......................... 2010 1 0159116

(51) Int. Cl.
*G02F 1/1343* (2006.01)
*G02F 1/1362* (2006.01)

(52) U.S. Cl.
CPC ...... *G02F 1/1343* (2013.01); *G02F 1/136213* (2013.01); *G02F 1/136286* (2013.01)

(58) Field of Classification Search
USPC ..................................................... 349/38–39
See application file for complete search history.

(56) References Cited

U.S. PATENT DOCUMENTS 6,894,734 B1 * 5/2005 Ihara ............................... 349/38
7,095,469 B2   8/2006 Kim et al.
(Continued)

FOREIGN PATENT DOCUMENTS

| CN | 1893088 A | 1/2007 |
| CN | 101021659 A | 8/2007 |

(Continued)

OTHER PUBLICATIONS

International Search Report: mailed Aug. 4, 2011; PCT/CN2011/073157.

*Primary Examiner* — Lauren Nguyen
(74) *Attorney, Agent, or Firm* — Ladas & Parry LLP (57) ABSTRACT

Embodiments of the invention disclose an array substrate and a manufacturing method thereof and a liquid crystal display. In the array substrate, an additional electrode is formed above a gate line, the additional electrode and the gate line are spaced from each other by a gate insulation layer, and the additional electrode is connected electrically with the common electrode line; pixel electrode extends to over the additional electrode and is overlapped with the additional electrode, the overlapped portion of the pixel electrode and both the additional electrode and the common electrode line forms a storage capacitor. The liquid crystal display according to the embodiment of the invention comprises the above array substrate.

14 Claims, 10 Drawing Sheets

(56) References Cited

U.S. PATENT DOCUMENTS

| | | | |
|---|---|---|---|
| 2003/0086043 A1* | 5/2003 | Seo et al. | 349/129 |
| 2005/0105032 A1* | 5/2005 | Ono et al. | 349/139 |
| 2007/0058096 A1 | 3/2007 | Tsai et al. | |
| 2007/0153141 A1 | 7/2007 | Tsai et al. | |
| 2008/0111962 A1* | 5/2008 | Lin et al. | 349/139 |
| 2009/0121991 A1* | 5/2009 | Chung | G02F 1/136213 345/87 |

FOREIGN PATENT DOCUMENTS

| | | |
|---|---|---|
| CN | 101055383 A | 10/2007 |
| CN | 101114093 A | 1/2008 |
| CN | 101178525 A | 5/2008 |
| JP | 2006-322978 A | 11/2006 |

\* cited by examiner

FIG.10B

ARRAY SUBSTRATE WITH ADDITIONAL ELECTRODE FORMED ABOVE GATE LINE, MANUFACTURING METHOD THEREOF AND LIQUID CRYSTAL DISPLAY

TECHNICAL FIELD

Embodiments of the present invention relate to an array substrate, a manufacturing method thereof and a liquid crystal display.

BACKGROUND

Liquid crystal displays are conventional plat plate displays at present; the thin film transistor liquid crystal displays (TFT-LCDs) are popular products among liquid crystal displays. A liquid crystal panel is an important component in a TFT-LCD, which generally comprises an array substrate and a color filter substrate which are assembled together, with a liquid crystal layer filled therebetween.

Figure 1A:
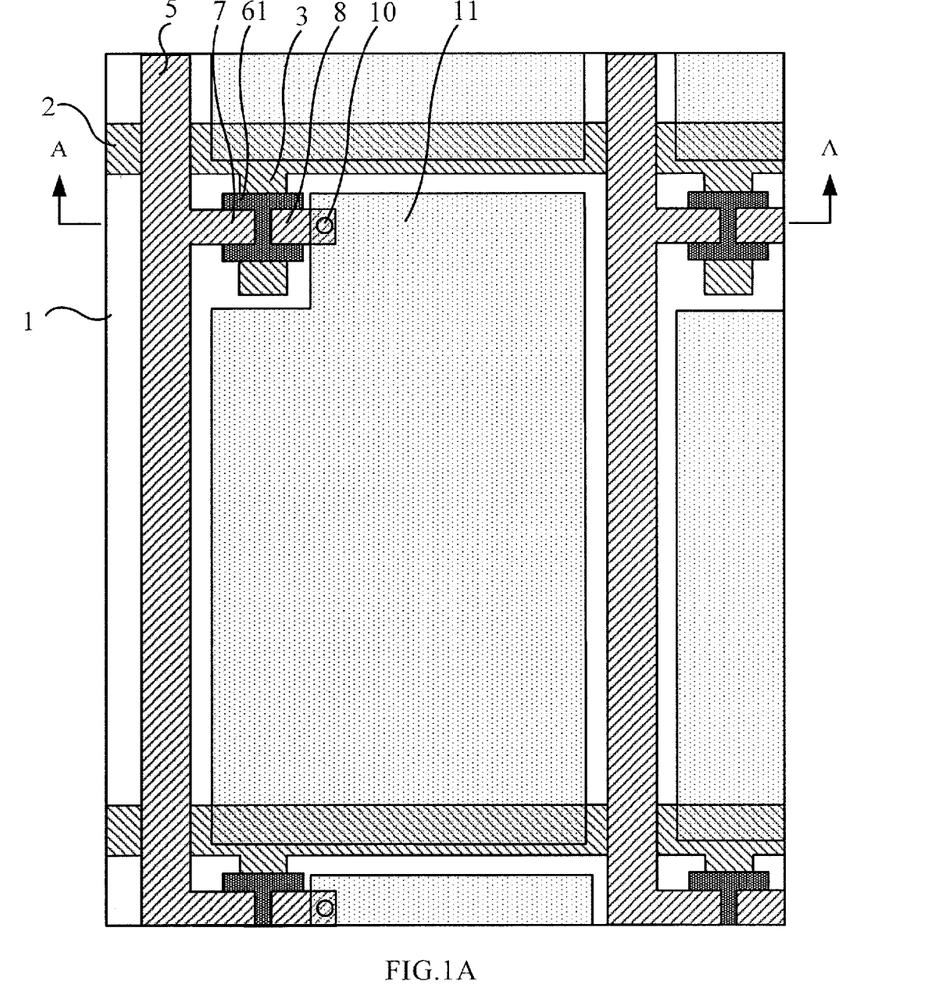
FIG. 1A is a schematic partial top structure view of an existing array substrate.
Figure 1B:
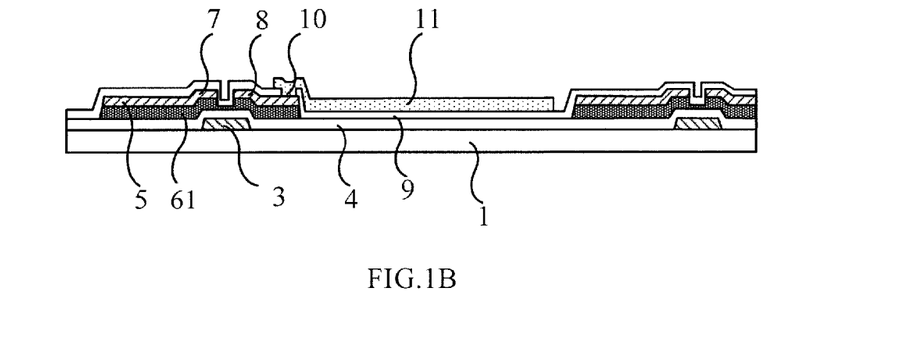
FIG. 1B is a schematic side sectional structure view along line A-A in FIG. 1A.

FIG. 1A is a schematic partial top structure view of an existing array substrate. FIG. 1B is a schematic side sectional structure view along line A-A in FIG. 1A. As shown in FIGS. 1A and 1B, this array substrate comprises a base substrate 1, on which data lines 5 and gate lines 2 which are cross each other are formed; the data lines 5 and the gate lines 2 define pixel units which are arranged in a matrix; each pixel unit comprises a TFT switch and a pixel electrode 11; the TFT switch comprises a gate electrode 3, a source electrode 7, a drain electrode 8 and an active layer 61; the gate electrode 3 is connected with a gate line 2, the source electrode 7 is connected with a data line 5, the drain electrode 8 is connected with the pixel electrode 11, and the active layer 61 is formed between the source and drain electrodes 7 and 8 and the gate electrode 3. The data lines 5, the gate lines 2, the gate electrodes 3, the source electrodes 7, the drain electrodes 8 and the active layer 61 of TFT switches, and the pixel electrodes 11 described above may be referred to collectively as conductive patterns. For the insulation between the conductive patterns, the conductive patterns provided in the same layer may be achieved by separate arrangement, and the conductive patterns provided in different layers may be achieved by providing an interlayer insulation layer sandwiched between the patterns. Additionally, the conductive patterns provided in different layers can be connected electrically with each other through via holes passing through the insulation layer between the layers.

During the display process of a TFT-LCD, the image signal voltages are input into pixel electrodes via data lines through TFT switches. Since it is necessary for the pixel electrodes to keep the image signal voltages in the period of one frame, a storage capacitor (Cs) is needed to be formed in each pixel unit to keep the image signal voltage on the pixel electrode. There are two ways to form the storage capacitor in the related art, one is form storage capacitors based on gate lines (Cs on Gate), the structure of which is shown in FIGS. 1A and 1B. The pixel electrode 11 in each pixel unit extends over the gate line 2 of the adjacent pixel unit, therefore this overlapped portions of the pixel electrode 11 and the adjacent gate line 2 form the storage capacitor.

Figure 2A:
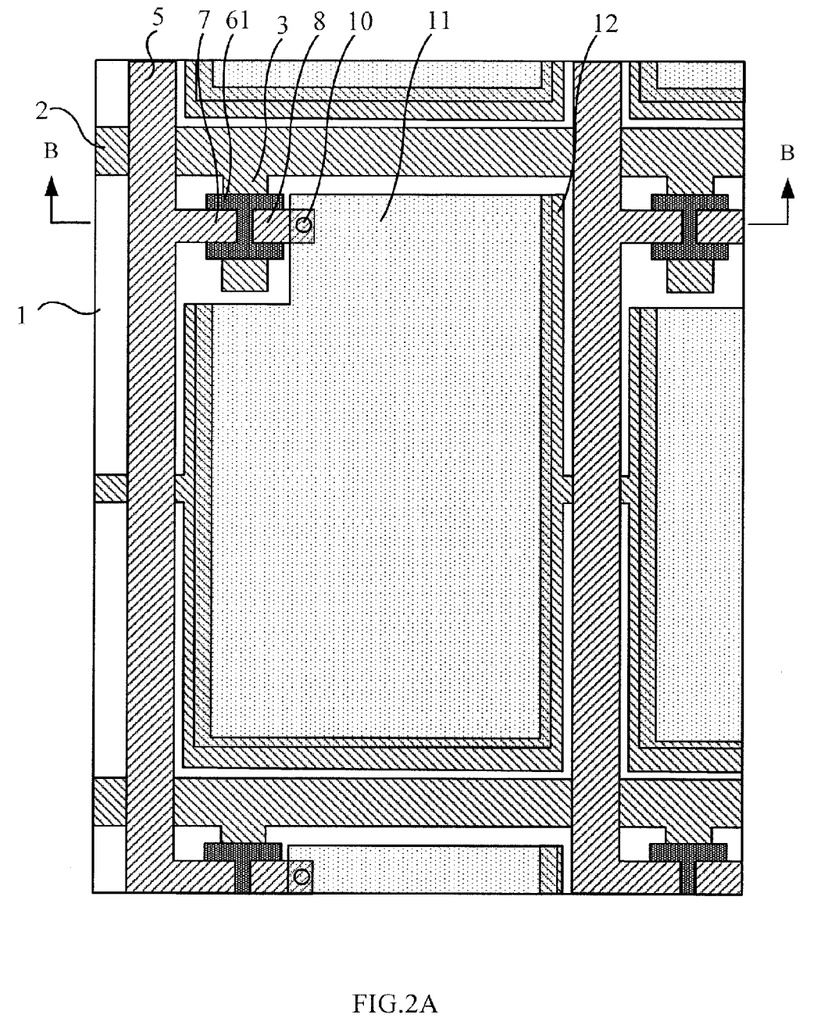
FIG. 2A is a schematic partial top structure view of another existing array substrate.
Figure 2B:
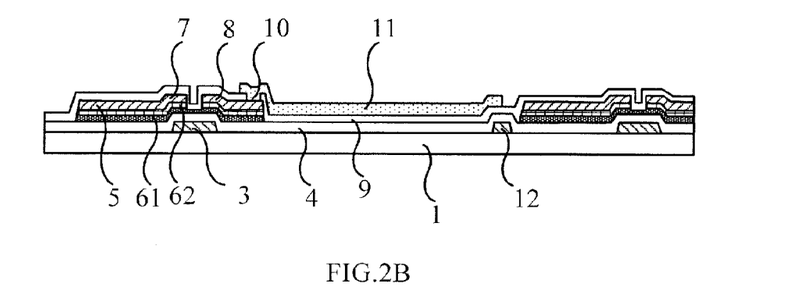
FIG. 2B is a schematic side sectional structure view along line B-B in FIG. 2A.

The other way is to form storage capacitors based on common electrode lines (Cs on Common), the structure of which is as shown in FIGS. 2A and 2B. In this way, the array substrate further comprises common electrode lines 12 which are in the same layer as but not crossed with the gate lines 2, and the overlapped portions of the pixel electrode 11 and the common electrode line 12 form the storage capacitor. In the structure shown in FIGS. 2A and 2B, the difference compared with FIGS. 1A and 1B lies in the common electrode lines 12 and the ohmic contact layer 62 formed on the active layer 61 for reducing the contact resistance of the active layer 61 with both the source electrode 7 and the drain electrode 8.

SUMMARY

One embodiment of the invention provides an array substrate comprising a base substrate; a data line and a gate line which are formed on the base substrate and intersect with each other, wherein the data line and the gate line define pixel unit arranged in a matrix, and each pixel unit comprises a thin film transistor (TFT) switch and a pixel electrode; a common electrode line formed on the base substrate; and an additional electrode formed above the gate line, wherein the additional electrode and the gate line are spaced from each other with an insulation layer, and the additional electrode is connected electrically with the common electrode line; and wherein the pixel electrode extends to over the additional electrode and is overlapped with the additional electrode with a passivation layer spaces them, the pixel electrode is overlapped with the additional electrode and common electrode line to form the storage capacitor.

Another embodiment of the invention provides a manufacturing method of array substrate comprising a step of forming a gate line, a common electrode line, a data line, a thin film transistor (TFT) switch and a pixel electrode on a base substrate respectively, the gate line and the data line are cross to form pixel units arranged in matrix manner, each pixel unit comprises a TFT switch and pixel electrode, wherein an additional electrode is also formed at the same time of forming the data line, so as to enable the additional electrode to be located above the gate line, the additional electrode and the gate line are spaced from each other with an insulation layer, and the additional electrode is connected electrically with the common electrode line; the pixel electrode extends to over the additional electrode and is overlapped with the additional electrode, and the pixel electrode is overlapped with the additional electrode and common electrode line to form the storage capacitor.

Yet another embodiment of the invention provides a liquid crystal display comprising a liquid crystal panel, wherein the liquid crystal panel comprises a color filter substrate and the array substrate described above.

DETAILED DESCRIPTION

To make the purpose, the technical solutions and the advantages of the embodiments of the invention more clear, the technical solutions in the embodiment of the invention will be described clearly and entirely in conjunction with the drawings in the embodiment of the invention below. Apparently, the described embodiments are a portion of the embodiments of the invention, but not all embodiments. Based on the embodiment in the invention, all the other embodiments obtained by those skilled in the art under the precondition of no inventive work belong to the protection scope of the invention.

Embodiment 1

Figure 3A:
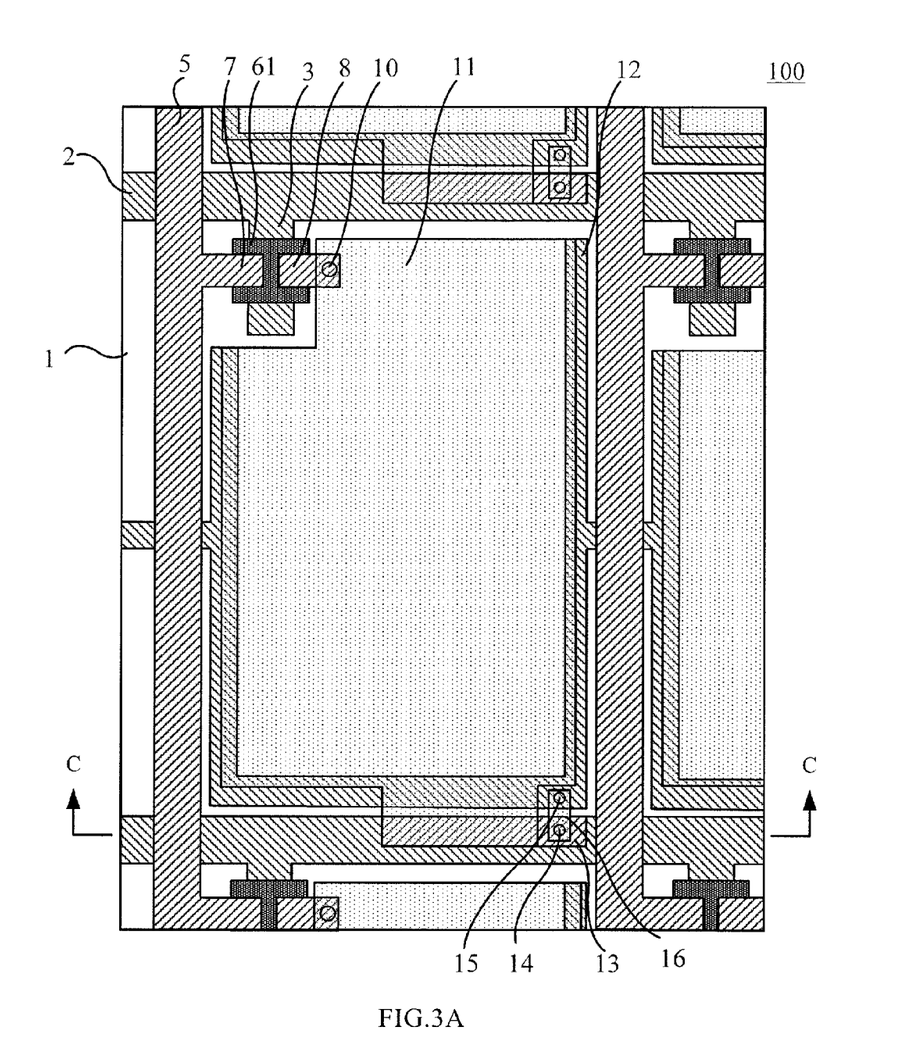
FIG. 3A is a schematic partial top structure view of the array substrate provided by a first embodiment of the invention.
Figure 3B:
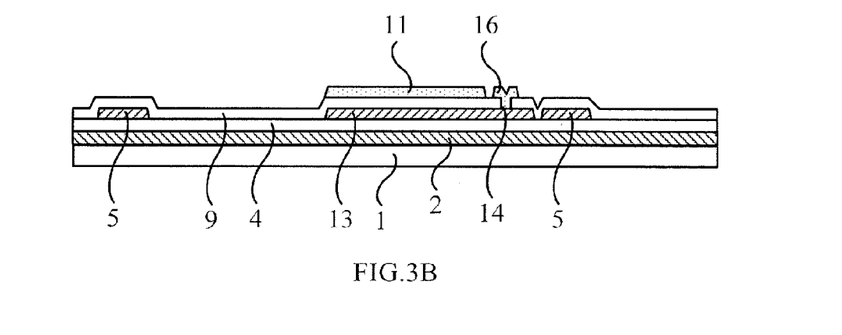
FIG. 3B is a schematic side sectional structure view along line C-C in FIG. 3A.

FIG. 3A is the schematic partial top structure view of an array substrate 100 provided by the embodiment 1 of the invention. FIG. 3B is the schematic side sectional structure view along line C-C in FIG. 3A.

As shown in FIGS. 3A and 3B, this array substrate 100 comprises a base substrate 1 which may be a glass substrate or a plastic substrate. A plurality of data lines 5 and a plurality of gate lines 2, which intersect with each other, are formed on the base substrate 1. The data lines 5 and the gate lines 2 define pixel units arranged in a matrix. Each pixel unit comprises a thin film transistor (TFT) switch and a pixel electrode 11, and the TFT switch is used for controlling display or no display of each pixel unit. The TFT switch comprised a gate electrode 3, a source electrode 7, a drain electrode 8 and an active layer 61, which are provided to obtain a layered structure. For each pixel unit, the gate electrode 3 of the TFT switch is connected with a gate line 2, the source electrode 7 is connected with a data line 5, the drain electrode 8 is connected with the pixel electrode 11, the active layer 61 is formed between the source and drain electrodes 7 and 8 and the gate electrode 3. The data line 5, the gate lines 2, the gate electrodes 3 of TFT switches, the source electrodes 7, the drain electrodes 8, the active layer 61 and the pixel electrodes 11 described above may be referred to collectively as conductive patterns. The insulation between the respective conductive patterns, for the conductive patterns provided in same one layer, may be achieved by providing spacing, and, for the conductive patterns provided in different layers, may be achieved by providing an insulation layer sandwiched between them. Additionally, the conductive patterns provided in different layers can be connected electrically with each other through via holes passing through the insulation layer between the layers; for example, the pixel electrode 11 may be connected with the drain electrode 8 through the via hole 10 in a passivation layer.

Common electrode lines 12 are also formed on the array substrate 100. In the embodiment, common electrode lines 12 are formed on the same layer as the gate lines 2, and the patterns of them are spaced from each other. Additional electrodes 13 are formed above the gate lines 2 (perpendicular to the direction of the base substrate 1), the additional electrodes 13 and the gate lines 2 are spaced from each other with an insulation layer 4, and the additional electrodes 13 is connected electrically with the common electrode lines 12 respectively. When the common electrode lines 12 are formed with the gate lines 2 on the same layer, the additional electrodes 13 are connected electrically with the common electrode lines 12 by the additional via holes 14, 15. The pattern of the pixel electrode 11 extends to over the additional electrode 13 and is overlapped with the additional electrode 13 by a passivation layer 9. The overlapped portions of the pixel electrode 11 and both the additional electrode 13 and the common electrode line 12 form a storage capacitor, the pixel electrode 11 functions as one electrode of the storage capacitor, and the additional electrode 13 and common electrode line 12 function as the other electrode of the storage capacitor.

In this embodiment, the additional via holes particularly comprises a first via hole 14 and a second via hole 15, the first via hole 14 is formed in the passivation layer 9 covering the data line 5 and the additional electrode 13, and is located over the additional electrode 13. The second via hole 15 is formed in the insulation layer 4 and the passivation layer 9, and is located over the common electrode line 12. A bridge line 16 is formed on the passivation layer 9, the bridge line 16 is connected with the additional electrode 13 and the common electrode line 12 through the first via hole 14 and the second via hole 15. This technical solution may adopt an etching process to form the additional via hole 14, 15 when etching to form the passivation layer via hole 10 by using an existing manufacturing process for the array substrate, and may form the bridge line 16 when etching to form the pixel electrode 11.

The additional electrodes 13 and the common electrode lines 12 may be connected in may ways, for example, the additional electrode 13 can be designed to have a shape not only over the gate line but also extending to over the common electrode line 12, and be connected with the common electrode line 12 by the additional via hole (not shown) in the gate insulation layer. In such a structure, it is not necessary to form the bridge line 16 as shown above.

The technical solution of this embodiment combined the two configurations of storage capacitor, one based on the gate line 2 and the other based on the common electrode line 12. The additional electrodes 13 formed on the gate lines 2 belong to an independent electrode area and form storage capacitors along with the pixel electrodes 11 therebetween. Simultaneously, the storage capacitors are also formed in the overlapped areas between the common electrode lines 12 and the pixel electrodes 11. These two kinds of storage capacitors together constitute the storage capacitors in the pixel units.

The computing formula of the capacitance value for a flat capacitor is: $C=\epsilon S/4\pi kd$, wherein C is the capacitance value, $\epsilon$ is the dielectric constant, k is the electrostatic force constant, S is the overlapped area value between the two electrodes of the capacitor, and d is the distance between the two electrodes of the capacitor. The technical solution of the embodiment of the invention, on one hand, increases the overlapped area value of a storage capacitor by means of an additional electrode, which therefore can improve the capacitance value of the storage capacitor or can reduce the area of the common electrode line given that the capacitance storage capacitance value is kept constant, such that the aperture ratio of the pixel unit can be improved; on the other hand, in the configuration of the storage capacitor based on the gate line, the distance between the gate line and the pixel electrode is greater than the distance between the additional electrode and the pixel electrode, thus this portion of the value for storage capacitor of the technical solution of this embodiment is also enhanced compared with the related art; on sill another hand, since the parasitic capacitance is reduced, the structure of this embodiment may further improve the resistance-capacitance delay characteristics and improve display quality compared with the storage capacitor based on the gate line.

Embodiment 2

Figure 4:
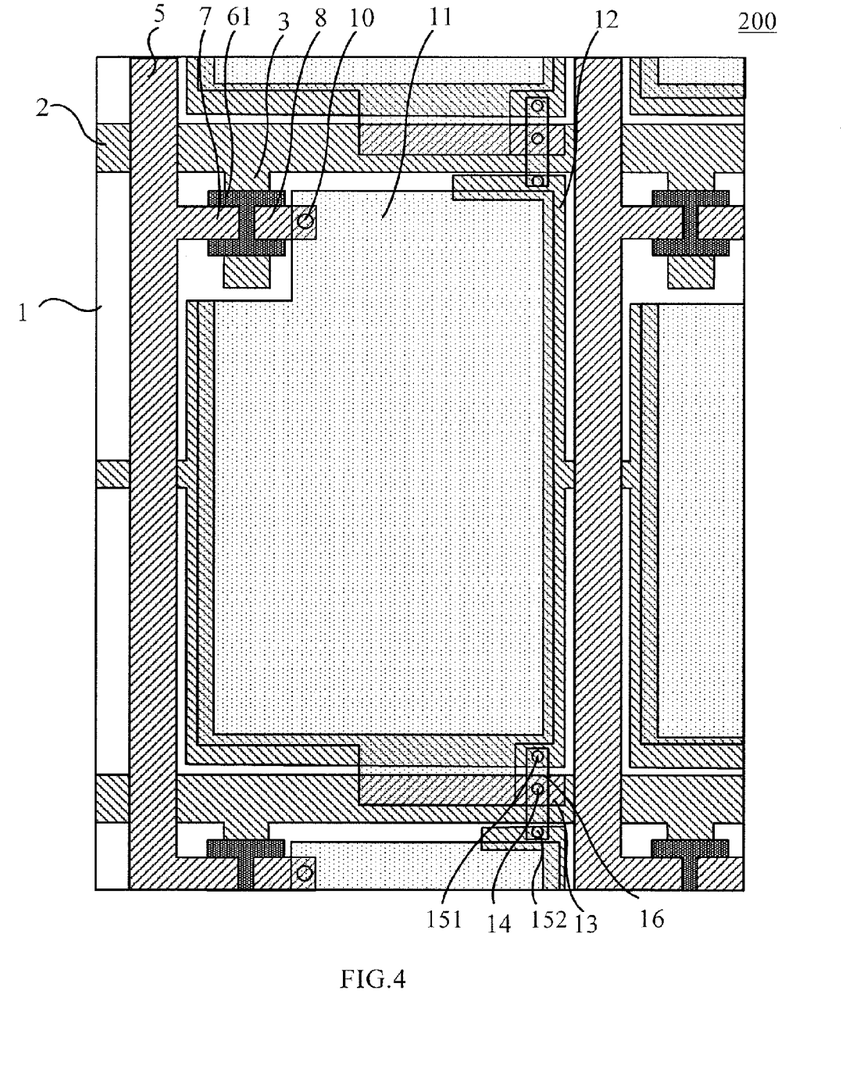
FIG. 4 is a schematic partial top structure view of the array substrate provided by a second embodiment of the invention.

FIG. 4 is a schematic partial top structure view of an array substrate 200 provided by the embodiment 2 of the invention. This embodiment differs from the embodiment 1 in that, the additional electrode 13 on each gate line 2 is connected electrically with the common electrode lines 12 in the adjacent two pixel units. This technical solution may be achieved simply by modifying the number of the additional via holes and position appropriately, and modifying the pattern of the bridge line 16. In FIG. 4, the bridge line 16 is connected electrically with the two common electrode lines 12 by the via holes 151, 152 above the common electrode lines 12 formed respectively in the adjacent two pixel units.

The technical solution of this embodiment can not only improve the storage capacitance, but also connect the adjacent common electrode lines formed in lines by the another electrodes to avoid the common voltage difference from being produced between the respective common electrode lines and to enable the higher uniformity of the common voltage over the common electrode lines, so as to avoid the flicking phenomenon of the pixel unit which occurs during the process of display.

Embodiment 3

Figure 5A:
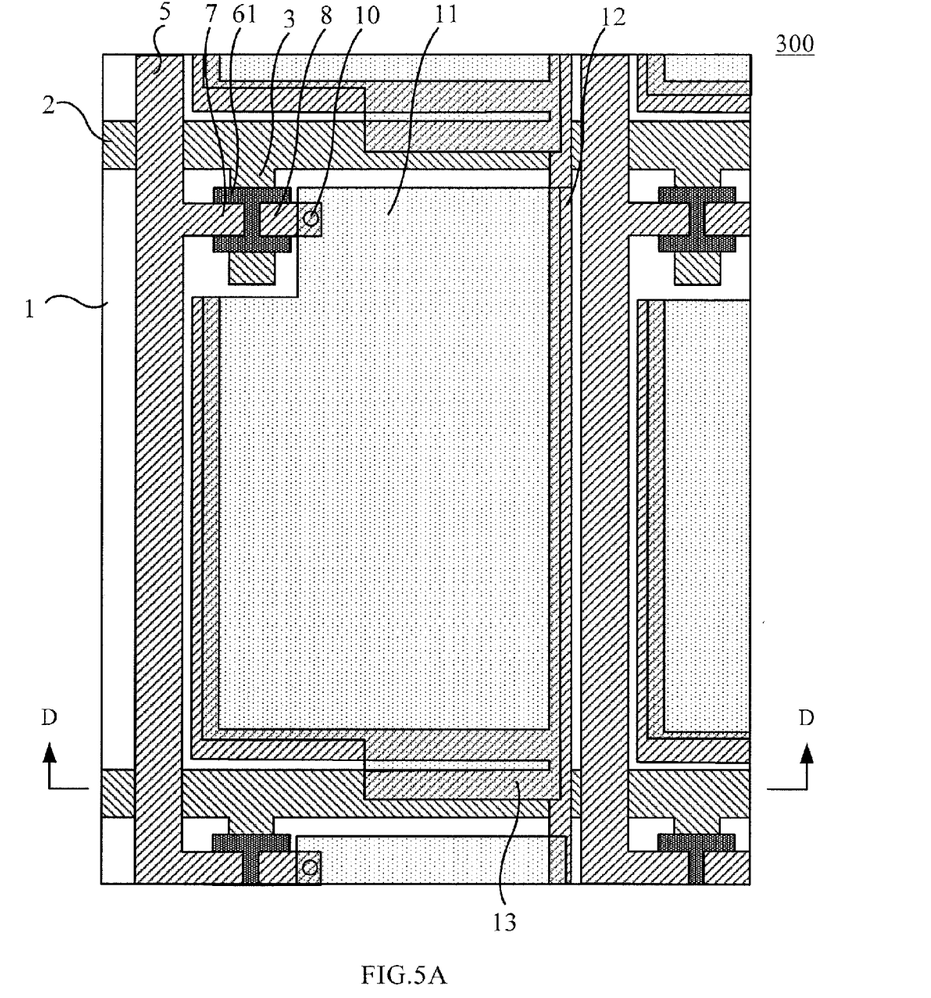
FIG. 5A is a schematic partial top structure view of the array substrate provided by a third embodiment of the invention.
Figure 5B:
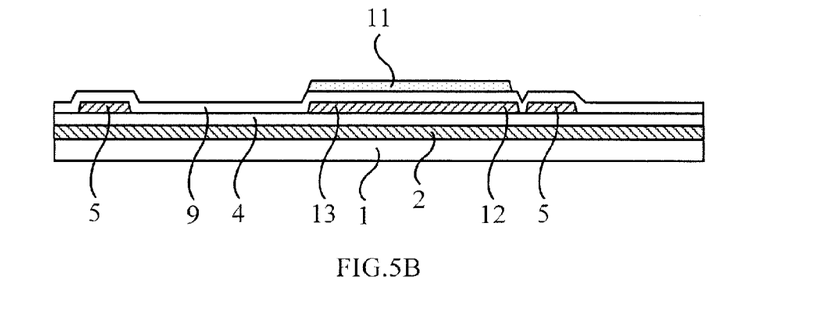
FIG. 5B is a schematic side sectional structure view along line D-D in FIG. 5A.

FIG. 5A is a schematic partial top structure view of an array substrate 300 provided by the embodiment 3 of the invention. FIG. 5B is a schematic side sectional structure view along line D-D in FIG. 5A.

The technical solution of this embodiment differs from the embodiment 1 in that: the common electrode line 12 is in a same layer as the data line 5 and the patterns of them are spaced from each other, and the additional electrode 13 and the common electrode line 12 are formed integratedly. As shown in FIG. 5A, the additional electrode 13 extends transversely parallel to and above the gate line 2 from the common electrode line 12 which extends longitudinally so as to be overlapped with the gate line 2 through the gate insulation layer 4.

The technical solution of this embodiment still has the advantage of increasing the storage capacitance, and can reduce the area of the common electrode lines under the condition of forming the same storage capacitance, improving the aperture ratio of the pixel unit. Additionally, compared with the technical solution of the embodiment 1, this embodiment also omits the process of forming the additional electrode via hole and the bridge line.

Embodiment 4

Figure 6:
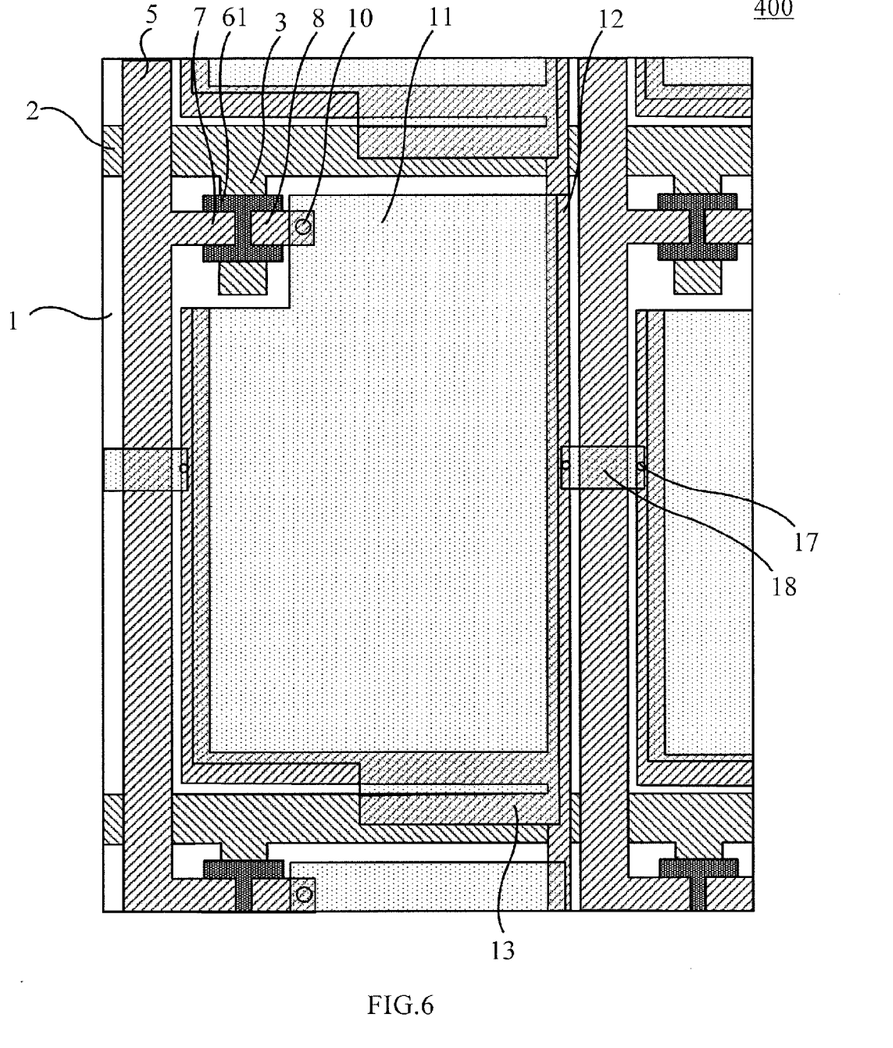
FIG. 6 is a schematic partial top structure view of the array substrate provided by a fourth embodiment of the invention.

FIG. 6 is a schematic partial top structure view of an array substrate 400 provided by the embodiment 4 of the invention. This embodiment is based on embodiment 3. Connection via holes 17 are formed in the passivation layer 9 on the common electrode lines 12 in the adjacent pixel units on both sides of each data line 5. Connection lines 18 are formed in the passivation layer 9 on the data line 5. The connection lines 18 are connected with the common electrode lines 12 in the adjacent pixel units by the connection via holes 17.

The technical solution of this embodiment can not only improve the storage capacitance, but connect the adjacent common electrode lines formed in lines to avoid the common voltage difference from being produced between the common electrode lines and to enable the higher uniformity of the common voltage over the common electrode lines, avoiding the flicker phenomenon of the pixel unit which occurs during the process of display.

The embodiment of the invention further provides a manufacturing method of an array substrate. This method comprises a step of forming patterns of a gate line, a gate electrode, a common electrode line, a data line, an active layer, a source electrode, a drain electrode and a pixel electrode on a base substrate respectively; at the time of forming the pattern of the data line, also simultaneously forming a pattern of an additional electrode which is above the gate line, the additional electrode being spaced from the gate line through a gate insulation layer and connected electrically with the common electrode line. The formed pattern of the pixel electrode extends to over the additional electrode and is overlapped with the additional electrode, and the overlapped portions of the pixel electrode and both the additional electrode and the common electrode line form a storage capacitor.

There are various manners for the step of forming the gate line, the gate electrode, the common electrode line, the data line, the active layer, the source electrode, the drain electrode and the pixel electrode pattern; a typical 4-mask process will be taken as an example for illustration below.

Embodiment 5

Figure 7A:
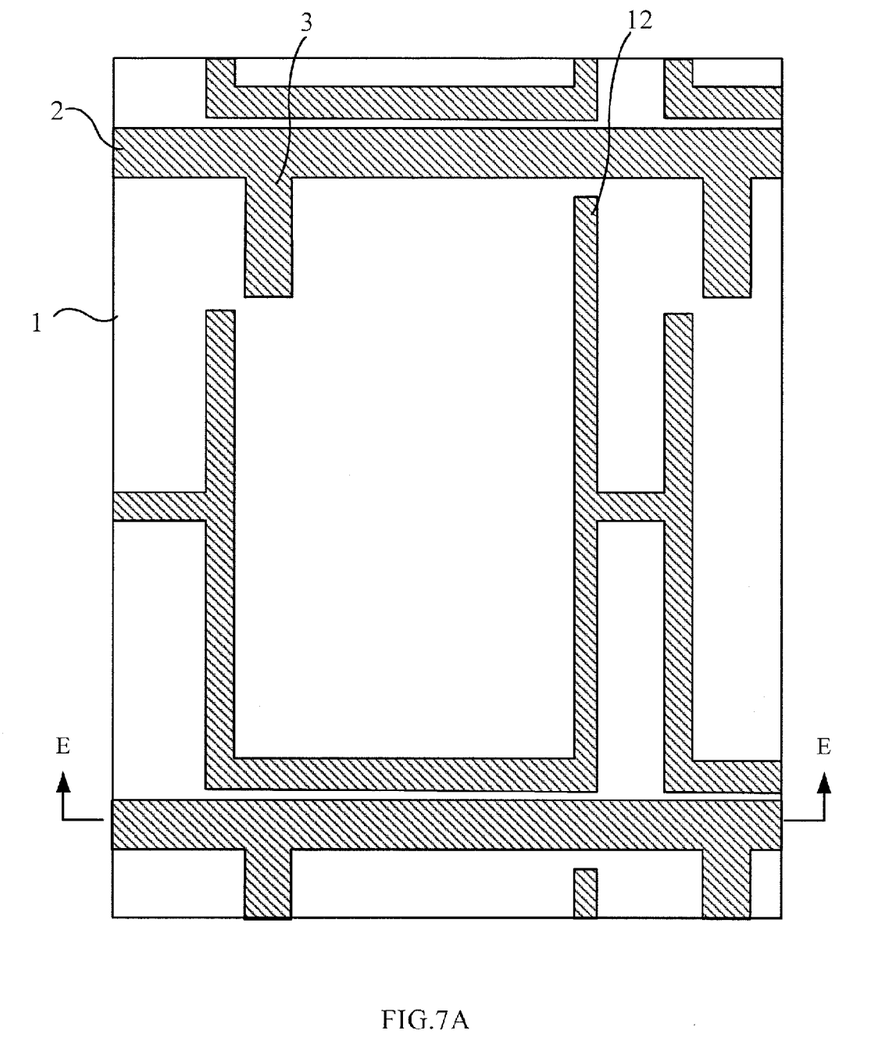
FIG. 7A is a schematic partial top structure view 1 of the array substrate manufactured by a fifth embodiment of the invention.
Figure 7B:
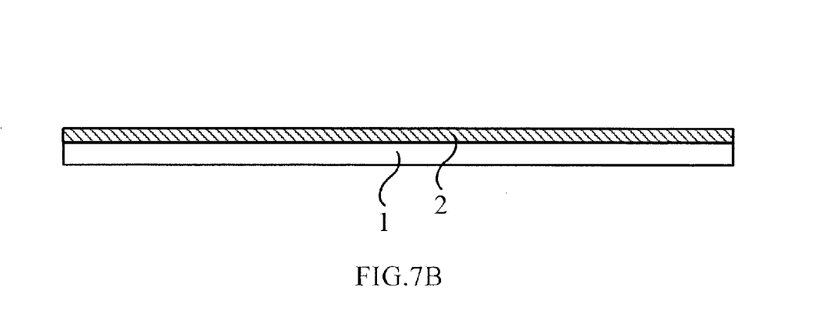
FIG. 7B is a schematic side sectional structure view along line E-E in FIG. 7A.

A manufacturing method of array substrate provided by the embodiment 5 of the invention comprises the following steps:

Step 710, forming patterns comprising a gate line 2, gate electrode 3 and a common electrode line 12 on a base substrate 1, wherein the patterns of the common electrode line 12 and the gate line 2 are spaced from each other, as shown in FIGS. 7A and 7B. The base substrate 1 may be a glass substrate or a plastic substrate.

Step 710, particularly depositing a layer of metal thin film, which may be an opaque metal, such as aluminum, molybdenum etc., by a magnetron sputtering method, and then adopting a patterning process to form the required pattern by exposing with a mask plate, developing, etching and so on.

Step 720, forming a gate insulation layer 4 on the base substrate 1 which has been formed with the above patterns. The gate insulation layer 4 may be formed by depositing an insulated material by a plasma enhanced chemical vapor deposition (PECVD) method.

Figure 8A:
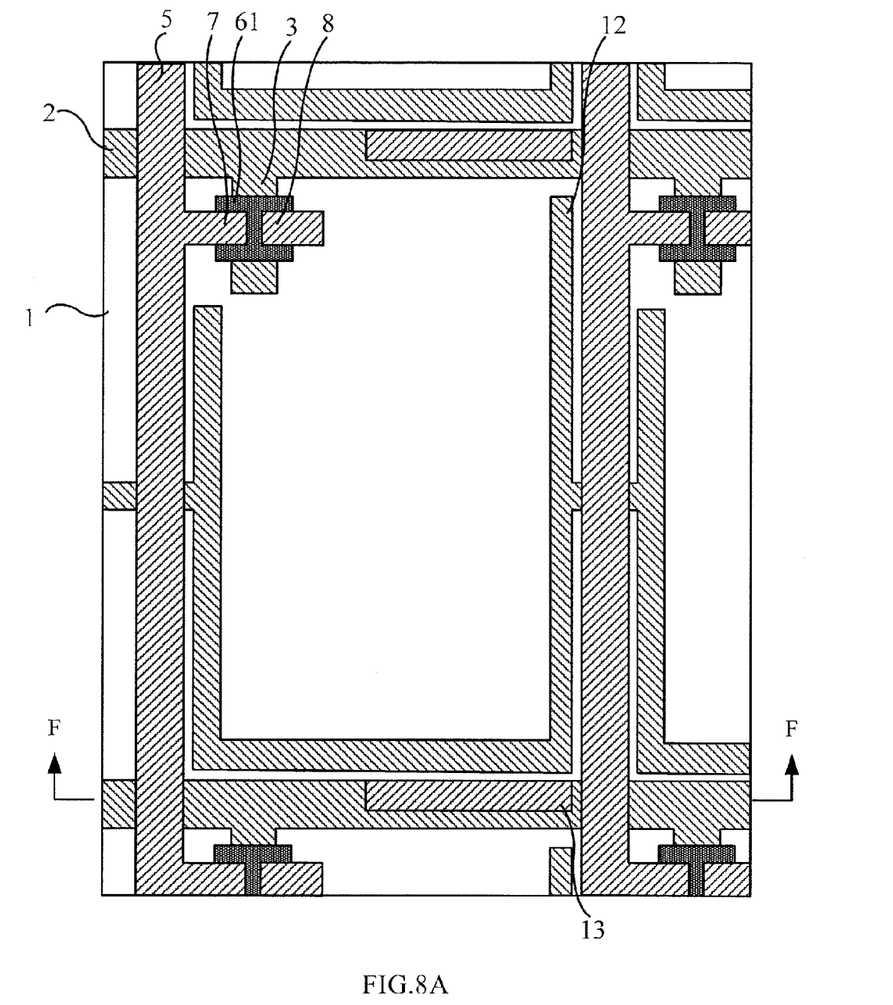
FIG. 8A is a schematic partial top structure view 2 of the array substrate manufactured by the embodiment 5 of the invention.
Figure 8B:
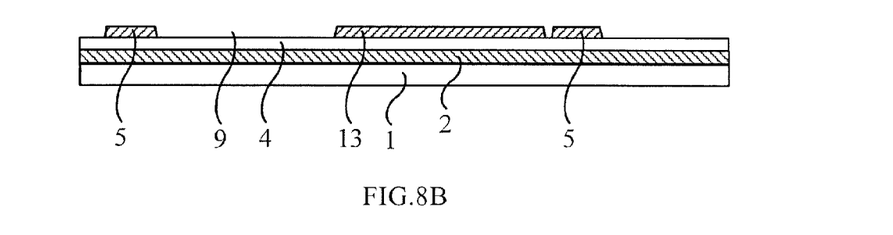
FIG. 8B is a schematic side sectional structure view along line F-F in FIG. 8A.

Step 730, forming pattern comprising a data line 5, an active layer 61, a source electrode 7, a drain electrode 8 and an additional electrode 13 on the gate insulation layer 4, particularly as shown in FIGS. 8A and 8B.

Step 730 may particularly be conducted to form the 5 patterns by using a dual-tone mask plate to perform half exposure mask etching.

Step 740, forming a passivation layer 9 on the base substrate 1 with the above patterns formed.

Step 750, forming a passivation layer via hole 10 and an additional via hole in the passivation layer 9, wherein the passivation layer via hole 10 corresponds to the position of the drain electrode 8 and the additional via holes 14, 15 correspond respectively to the positions of the additional electrode 13 and the common electrode line 12;

Step 760, for patterns comprising a pixel electrode 11 and a bridge line 16 on the base substrate 1 with the above patterns formed. The bridge line is connected with the additional electrode 13 and common electrode line 12 through the additional via holes 14, 15, in reference to FIGS. 3A and 3B. According to the different positions of the additional via holes 14, 15 and the bridge line 16, the structure as shown in FIGS. 4A and 4B may also be formed.

Based on the embodiment, a third additional via hole located in the adjacent pixel units may be formed in the passivation layer. The third additional via holes are formed in the passivation layer and the gate insulation layer, and correspond to the positions of common electrode lines in adjacent pixel units. Therefore, each bridge line formed on the passivation layer passes the first, the second and the third additional via holes and is connected with the additional electrode, the common electrode line and the common electrode line in the adjacent pixel unit.

The manufacturing method provided by this embodiment can be used for manufacturing the array substrate according to the embodiment of the invention, which has advantages of increasing the storage capacitance value and the pixel unit aperture ratio, and can use the existing processes of manufacturing the array substrate without increasing the difficulty of the process.

Embodiment 6

The manufacturing method of array substrate provided by the embodiment 6 of the invention comprises the following steps.

Figure 9A:
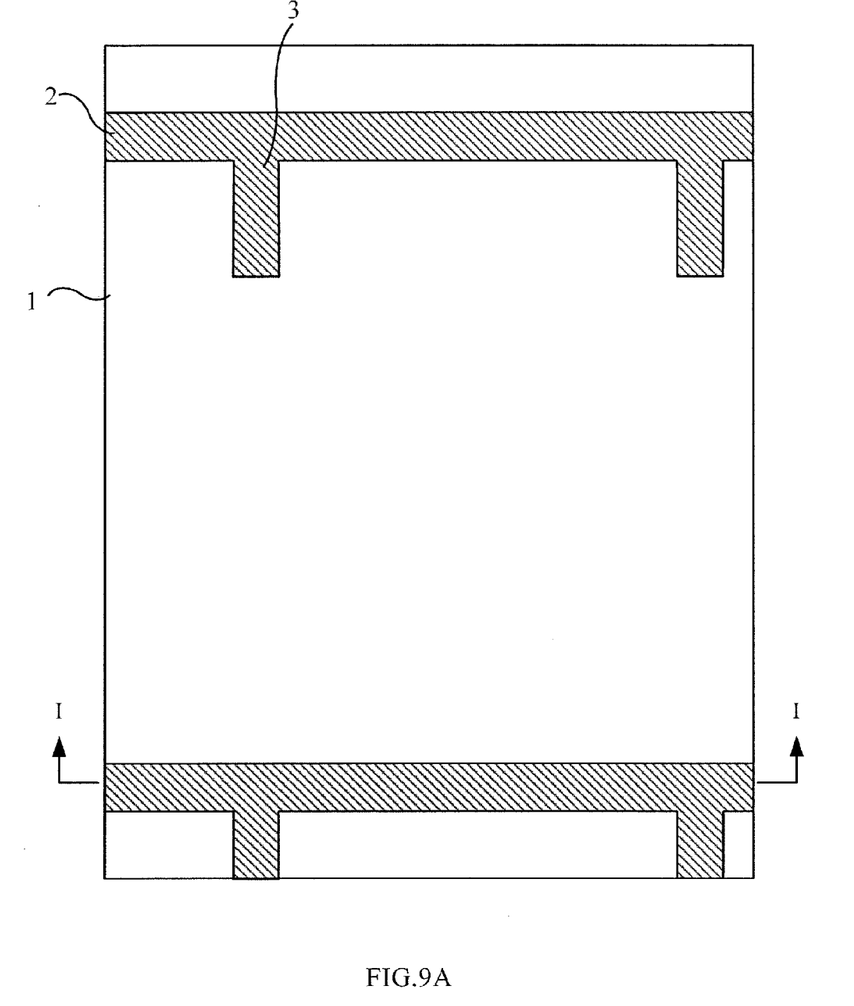
FIG. 9A is a schematic partial top structure view 1 of the array substrate manufactured by the embodiment 6 of the invention.
Figure 9B:
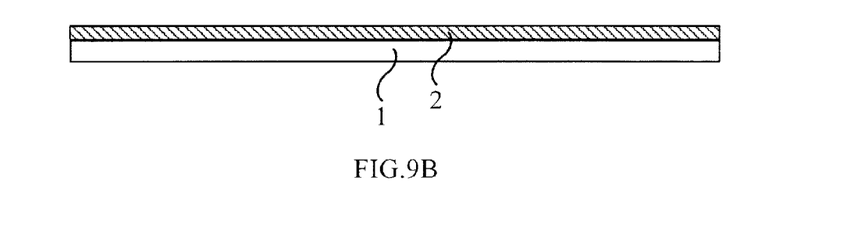
FIG. 9B is a schematic side sectional structure view along line G-G in FIG. 9A.

Step 101, forming patterns comprising a gate line 2 and a gate electrode 3 on a base substrate 1, as shown in FIGS. 9A and 9B.

Step 102, forming a gate insulation layer 4 on the base substrate 1 with the above formed pattern.

Figure 10A:
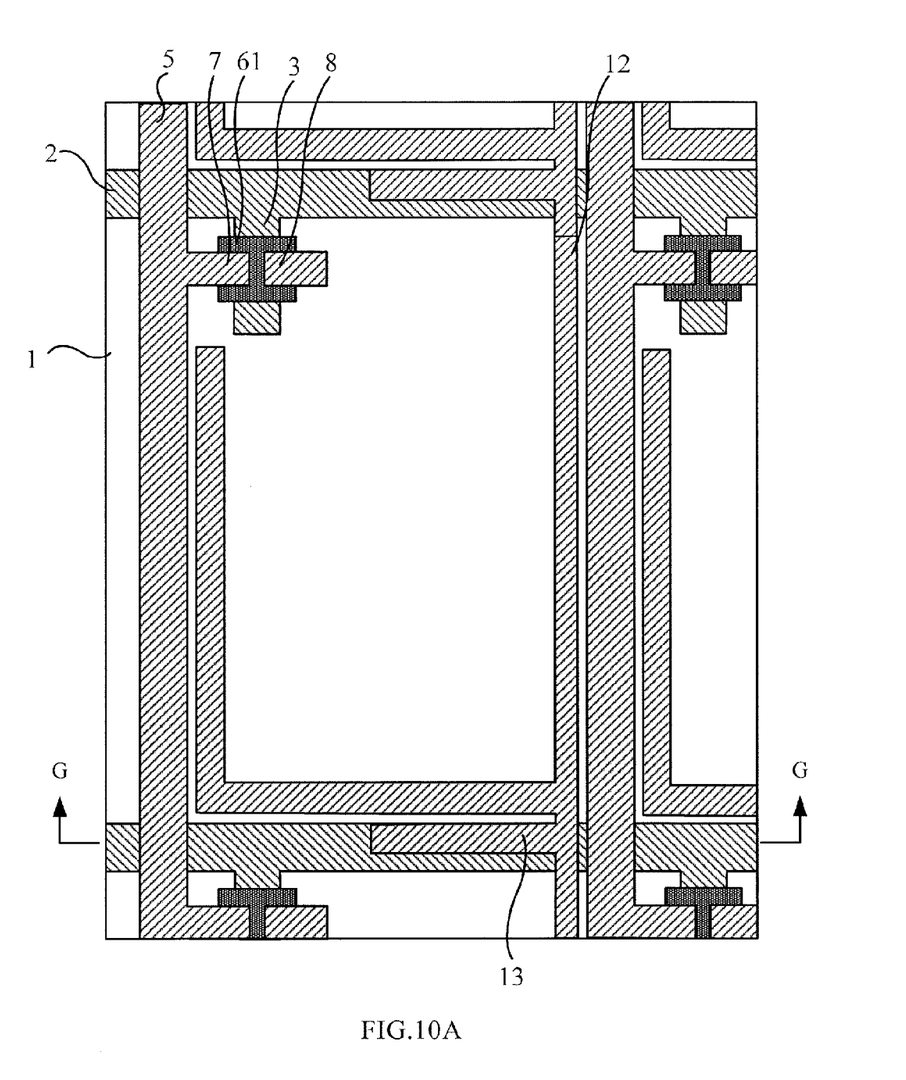
FIG. 10A is a schematic partial top structure view 2 of the array substrate manufactured by the embodiment 6 of the invention.
Figure 10B:
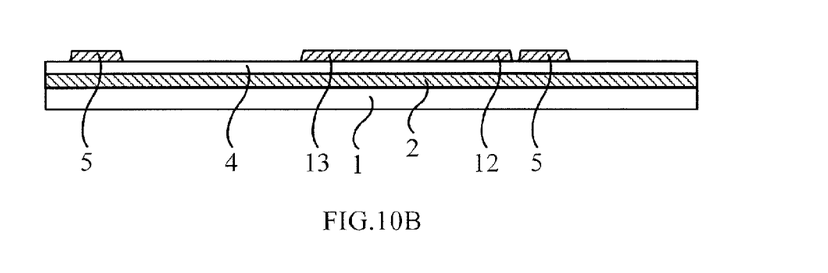
FIG. 10B is a schematic side sectional structure view along line I-I in FIG. 10A.

Step 103, forming patterns comprising a data line 5, an active layer 61, a source electrode 7, a drain electrode 8, an additional electrode 13 and a common electrode line 12 on the gate insulation layer 4, wherein the common electrode line 12 and the additional electrode 13 are formed in one piece. As shown in FIGS. 10A and 10B, the additional electrode 13 extends transversely parallel to and above the gate line 2 from the common electrode line 12 which extends longitudinally, so as to be overlapped with the gate line 2 through the gate insulation layer 4.

Step 104, forming a passivation layer 9 on the base substrate 1 with the above formed pattern.

Step 105, forming a passivation layer via hole 10 in the passivation layer 9. The passivation layer via hole 10 corresponds to the position of the drain electrode 8.

Step 106, forming patterns comprising a pixel electrode 11 on the base substrate 1 with the above formed pattern, as shown in FIG. 5A and 5B.

Based on the embodiment, possible steps may further include: forming the connection via holes 17 when forming the passivation layer via hole 10, wherein the connection via holes 17 are formed over the common electrode line 12 in the adjacent pixel units on the both sides of each data line 5; forming the pattern of a connection line 18 when forming the pixel electrode 11, wherein the connection line 18 is connected with the common electrode lines 12 in the adjacent pixel units through the connection via holes 17, particularly in reference to FIG. 6.

The manufacturing method provided by this embodiment may be used for manufacturing the array substrate according to the embodiment of the invention, which has advantages of increasing the storage capacitance value and the pixel unit aperture ratio, and uses the existing processes of manufacturing the array substrate without increasing the difficulty of the process.

The embodiment of the invention further provides a liquid crystal display comprising a liquid crystal panel, wherein the liquid crystal panel comprises a color filter substrate and an array substrate provided by any embodiment of the invention.

Finally, it should be explained that, the above embodiments are only used for explaining the technical solution of present invention, and not for limitation thereto. Although the present invention has been explained in details with reference to the preferred embodiments, it should be understood by those skilled in the art that modifications and equivalent alternations may be made to the technical solution of present invention, and these modifications and equivalent alternations can not depart the modified technical solution from the spirit and scope of the technical solution of present invention.

What is claimed is:

1. An array substrate comprising:
    a base substrate;
    a data line and a gate line which are formed on the base substrate and intersect with each other, wherein the data line and the gate line define pixel units arranged in a matrix, and each pixel unit comprises a thin film transistor (TFT) switch and a pixel electrode;
    a common electrode line formed on the base substrate; and
    an additional electrode formed above the gate line, wherein the additional electrode and the gate line are spaced from each other through a gate insulation layer, and the additional electrode is connected electrically with the common electrode line;
    wherein the pixel electrode extends to over the additional electrode and is overlapped with the additional electrode with a passivation layer interposed therebetween, and the pixel electrode is overlapped with the additional electrode and common electrode line to form a storage capacitor; and
    wherein the additional electrode is not connected electrically with the pixel electrode, and the additional electrode is formed directly above the gate line, and no portions of the additional electrode are provided inside the pixel unit which is surrounded by two directly adjacent gate lines and two directly adjacent data lines.

2. The array substrate according to claim 1, wherein the additional electrode above each of the gate line is connected electrically with the common electrode lines in the adjacent two pixel units.

3. The array substrate according to claim 2, wherein the common electrode line and the gate line are formed in the same layer and spaced from each other.

4. The array substrate according to claim 1, wherein the common electrode line and the gate line are formed in the same layer and spaced from each other.

5. The array substrate according to claim 4, wherein the additional electrode is connected electrically with the common electrode line through additional via holes and a bridge line, the additional via holes comprise a first via hole and a second via hole, the first via hole is formed in the passivation layer covering the data line and the additional electrode and located above the additional electrode, and the second via hole is formed in the gate insulation layer and the passivation layer and located above the common electrode line; and the bridge line is formed on the passivation layer and is connected with the additional electrode and the common electrode line through the first via hole and the second via hole.

6. The array substrate according to claim 1, wherein the common electrode line and the data line are formed in the same layer and are spaced from each other, and the additional electrode and the common electrode line are formed in one piece.

7. The array substrate according to claim 6, wherein connection via holes corresponding to the respective common electrode lines are formed in the passivation layer in the adjacent pixel units on two sides of each data line, a connection line is formed on the passivation layer, the connection line is connected with the respective common electrode lines in the adjacent pixel units through the connection via hole.

8. A manufacturing method of an array substrate comprising a step of forming a gate line, a common electrode line, a data line, a thin film transistor (TFT) switch and a pixel electrode on a base substrate respectively, the gate line and the data line intersecting to form pixel units arranged in a matrix, each pixel unit comprising the TFT switch and the pixel electrode, wherein an additional electrode is further formed when forming the data line to enable the additional electrode to be located above the gate line, the additional electrode and the gate line are spaced from each other through a gate insulation layer, and the additional electrode is connected electrically with the common electrode line;

the pixel electrode extends to over the additional electrode and is overlapped with the additional electrode, the pixel electrode is overlapped with the additional electrode and common electrode line to form a storage capacitor; and the additional electrode is not connected electrically with the pixel electrode, and the additional electrode is formed directly above the gate line, and no portions of the additional electrode are provided inside the pixel unit which is surrounded by the two directly adjacent gate lines and the two directly adjacent data lines.

9. The manufacturing method of an array substrate according to claim 8, wherein the step of forming the gate line, the common electrode line, the data line, the TFT switch, the pixel electrode and the additional electrode on the base substrate comprises:

a) forming the gate line, a gate electrode of the TFT switch, and the common electrode line on the base substrate, the common electrode line and the gate line being spaced from each other;

b) forming a gate insulation layer on the base substrate after step a;

c) forming the data line, the active layer, the source electrode and the drain electrode of the TFT switch, and the additional electrode on the gate insulation layer;

d) forming a passivation layer on the base substrate after step c, a passivation layer via hole corresponding to the drain electrode being formed in the passivation layer; and e) forming the pixel electrode on the passivation layer, the pixel electrode being connected electrically with the drain electrode through the passivation layer via hole.

10. The manufacturing method of an array substrate according to claim 9, wherein, in step d, further a first additional via hole and a second additional via hole are formed in the passivation layer, the first additional via hole being formed in the passivation layer and corresponding to the position of the additional electrode, and the second additional via hole being formed in the passivation layer and the gate insulation layer and corresponding to the position of the common electrode line; and in step e, further a bridge line is formed on the passivation layer, the bridge line being connected to the additional electrode and the common electrode line through the first, the second additional via hole.

11. The manufacturing method of an array substrate according to claim 10, wherein, in step d, third additional via holes are formed in the passivation layer to be located in the adjacent pixel units, the third additional via holes being formed in the passivation layer and the gate insulation layer and corresponding to the positions of common electrode lines in adjacent pixel units, and the bridge line is connected with the additional electrode, the common electrode line and the common electrode line in the adjacent pixel units through the first, the second and the third additional via hole.

12. The manufacturing method of an array substrate according to claim 8, wherein the step of forming respectively the gate line, the common electrode line, the data line, the TFT switch, the pixel electrode and the additional electrode on the base substrate comprises:

a) forming the gate line and the gate electrode of the TFT switch on the base substrate;

b) forming a gate insulation layer on the base substrate after step a;

c) forming the data line, the active layer, the source electrode and the drain electrode of the TFT switch, the additional electrode and the common electrode line on the gate insulation layer, the common electrode line and the additional electrode being formed in one piece;

d) after step c, forming a passivation layer on the base substrate and forming a passivation layer via hole, which correspond to the position of the drain electrode, in the passivation layer; and f) forming the pixel electrode on the passivation layer.

13. The manufacturing method of an array substrate according to claim 12, wherein in step d, connection via holes are formed respectively in the passivation layer above the common electrode lines in adjacent pixel units on two sides of each data line; and in step f, further a connection line is formed on the passivation layer, the connection line being connected with the common electrode lines in the adjacent pixel units through the connection via hole.

14. An liquid crystal display comprising a liquid crystal panel, wherein the liquid crystal panel comprises a color filter substrate and the array substrate according to claim 1.

* * * * *